United States Patent
Henry

(10) Patent No.: US 7,477,790 B2
(45) Date of Patent: Jan. 13, 2009

(54) DECODING OF A DIGITAL IMAGE ENCODED AT A PLURALITY OF RESOLUTION LEVELS

(75) Inventor: Félix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 10/757,487

(22) Filed: Jan. 15, 2004

(65) Prior Publication Data

US 2004/0170331 A1      Sep. 2, 2004

(30) Foreign Application Priority Data

Jan. 15, 2003     (FR) .................................. 03 00396

(51) Int. Cl.
*G06K 9/36*       (2006.01)
(52) U.S. Cl. .................. 382/233; 382/167; 382/232; 705/400
(58) Field of Classification Search ............... 382/167, 382/232, 233; 705/400
See application file for complete search history.

(56) References Cited

U.S. PATENT DOCUMENTS

| | | | |
|---|---|---|---|
| 5,615,282 A * | 3/1997 | Spiegel et al. | 382/167 |
| 6,041,143 A * | 3/2000 | Chui et al. | 382/232 |
| 6,631,213 B1 | 10/2003 | Amonou et al. | 382/232 |
| 2002/0181789 A1 | 12/2002 | Okada | 382/233 |
| 2003/0154173 A1 * | 8/2003 | Henry | 705/400 |

OTHER PUBLICATIONS

A. Dumitras and F. Kossentini, "Fast and High Performance Image Subsampling Using Feedforward Neural Networks", IEEE Transactions of Signal Processing, vol. 9, No. 4, pp. 720-728, Apr. 2000.
O.K. Al-Shaykh et al., "JPEG-2000: A New Still Image Compression Standard", Signals, Systems, and Computers, 1998 IEEE, pp. 99-103.

* cited by examiner

*Primary Examiner*—Samir A. Ahmed
*Assistant Examiner*—Aklilu K Woldemariam
(74) *Attorney, Agent, or Firm*—Fitzpatrick, Cella, Harper & Scinto

(57) ABSTRACT

A method of decoding an encoded digital image, the encoded data of the image comprising a plurality of predefined resolutions, comprises the steps of:
  selecting a resolution lower than the highest of the predefined resolutions,
  determining the predefined resolution immediately above the selected resolution,
  determining a quantity of data of the determined predefined resolution, as a function of the ratio between the selected resolution and the determined predefined resolution,
  decoding the image at the determined predefined resolution, as a function of the determined quantity of data,
  subsampling the decoded image, as a function of the ratio between the selected resolution and the determined predefined resolution.

19 Claims, 4 Drawing Sheets

DECODING OF A DIGITAL IMAGE ENCODED AT A PLURALITY OF RESOLUTION LEVELS

The present invention generally relates to the decoding of a digital image encoded at a plurality of resolution levels.

The object of the encoding is to compress the signal, which makes it possible respectively to transmit the digital signal and to store it in memory while reducing the transmission time, or the transmission rate respectively, by reducing the space in memory that is used.

The invention is in the field of lossy compression of digital signals. The digital signals considered here are of any type, for example fixed images, video, sound, or computer data.

In what follows, the encoding and decoding of a fixed image will more particularly be considered.

Under the JPEG2000 standard, of which the description is available on the Internet at the address www.jpeg.org, the structure of the encoded data is such that an image may be decoded at different predefined resolution levels. These resolutions differ from each other by a factor of 2 in each dimension of the image.

For example, for an image of 1000×1000 pixels encoded in the form of a JPEG2000 file, it is possible to extract from that file a portion of the data and to decode that data in order to form an image of resolution 250×250 pixels.

By extracting supplementary data, it is possible to form an image of resolution 500×500 pixels. Finally, by decoding all the data, it is possible to form an image of resolution 1000×1000 pixels.

Thus, in general terms, multiresolution decoding of an image of size L×H pixels only makes it possible to access predefined resolutions corresponding to a size of $(L/2^N) \times (H/2^N)$, where N is an integer.

To obtain an image at a resolution that is intermediate with respect to the predetermined resolutions, for example 800×800 pixels, it is possible to decode the image at the predefined lower resolution (500×500 pixels) and then to oversample it to 800×800 pixels. The image obtained is then of poor quality.

It is also possible to decode the image at the predefined resolution above (1000×1000 pixels) and then to subsample to 800×800 pixels. In that case, it was necessary to extract and decode more data than really necessary for the construction of the image of 800×800 pixels.

The object of the present invention is to remedy the drawbacks of the prior art, by providing a method and device for decoding a digital image encoded at a plurality of predefined resolution levels which enable an image to be obtained at a resolution different from the predefined resolutions, with good image quality, while limiting the quantity of data processed.

To that end, the invention provides a method of decoding an encoded digital image, the encoded data of the image comprising a plurality of predefined resolutions, comprising the steps of:

selecting a resolution lower than the highest of the predefined resolutions, determining the predefined resolution immediately above the selected resolution, determining a quantity of data of the determined predefined resolution, as a function of the ratio between the selected resolution and the determined predefined resolution, decoding the image at the determined predefined resolution, as a function of the determined quantity of data, subsampling the decoded image, as a function of the ratio between the selected resolution and the determined predefined resolution.

The invention enables an image to be decoded at a different resolution than the predefined resolutions, with good image quality, while limiting the quantity of data processed.

This is because for the decoding according to the invention only a quantity of data proportional to the desired resolution is used. Thus the resources necessary for that decoding, such as memory, and the resources necessary for the possible transmission of that data, are not called upon by a flow of data much greater than that required for the selected resolution.

A virtually continuous range of resolutions is thus available to the user who can select a resolution for decoding the image from that range.

According to a preferred feature, the method of decoding comprises the prior display of the image at a predefined initial resolution and the selection of a resolution is an instruction for change of size of the image with respect to the predefined initial resolution.

The selection of the resolution for decoding is thus simple for the user.

According to a preferred feature, when the encoded data comprise a plurality of layers within each predefined resolution, the determination of a quantity of data is the determination of a number of layers of the determined predefined resolution.

According to a preferred feature, the determination of a quantity of data of the determined predefined resolution is performed as a function of the ratio between the number of pixels of the selected resolution and the number of pixels of the determined predefined resolution.

These calculations are carried out rapidly and make it possible to limit the quantity of data to be processed.

According to a preferred feature, the decoding of the image at the determined predefined resolution is furthermore carried out as a function of the data of the predefined resolutions lower than the selected resolution, if the determined predefined resolution is not the lowest for the image considered.

The decoding is thus performed so as to obtain the maximum image quality.

The invention further proposes a method of decoding encoded data, the encoded data comprising a plurality of predefined resolutions $R_n$, comprising the steps of:

determining an intermediate resolution between a first resolution $R_a$ and a second resolution $R_{a+1}$, determining a quantity of encoded data of the second resolution corresponding to the intermediate resolution, decoding the determined quantity of encoded data, and scaling the decoded image, as a function of the ratio between the intermediate resolution and one of the predefined resolutions $R_n$, wherein said determined quantity of encoded data includes encoded data corresponding to said first resolution $R_a$, and a part of encoded data included in encoded data corresponding to the second resolution $R_{a+1}$ but not included in the encoded data corresponding to said first resolution $R_a$.

The invention also proposes a method of decoding encoded data, the encoded data comprising a plurality of predefined resolutions, comprising the steps of:

selecting an intermediate resolution between a first predefined resolution and a second predefined resolution, the second resolution being higher than the first resolution, determining a quantity of encoded data of the second resolution, said quantity depending on the intermediate resolution, decoding the determined quantity of encoded data, and
subsampling the decoded data from the second resolution
to the intermediate resolution.

In possible embodiment, said determined quantity of encoded data is function of the ratio between the intermediate resolution and the second resolution.

In a complementary manner, the invention relates to a device for decoding an encoded digital image, the encoded data of the image comprising a plurality of predefined resolutions, the device comprising:

means for selecting a resolution lower than the highest of the predefined resolutions, means for determining the predefined resolution immediately above the selected resolution, means for determining a quantity of data of the determined predefined resolution, as a function of the ratio between the selected resolution and the determined predefined resolution, means for decoding the image at the determined predefined resolution, as a function of the determined quantity of data, means for subsampling the decoded image, as a function of the ratio between the selected resolution and the determined predefined resolution.

The device according to the invention comprises means for implementing the features presented above and has similar advantages to those presented above.

The invention further proposes a device for decoding encoded data, the encoded data comprising a plurality of predefined resolutions $R_n$, comprising the steps of:

means for determining an intermediate resolution between a first resolution $R_a$ and a second resolution $R_{a+1}$, means for determining a quantity of encoded data of the second resolution corresponding to the intermediate resolution, means for decoding the determined quantity of encoded data, and means for scaling the decoded image, as a function of the ratio between the intermediate resolution and one of the predefined resolutions $R_n$, wherein said determined quantity of encoded data includes encoded data corresponding to said first resolution $R_a$, and a part of encoded data included in encoded data corresponding to the second resolution $R_{a+1}$ but not included in the encoded data corresponding to said first resolution $R_a$.

The invention also proposes a device for decoding encoded data, the encoded data comprising a plurality of predefined resolutions, comprising:

means for selecting an intermediate resolution between a first predefined resolution and a second predefined resolution, the second resolution being higher than the first resolution;

means for determining a quantity of encoded data of the second resolution depending on the intermediate resolution;

means for decoding the determined quantity of encoded data;

means for subsampling the decoded data from the second resolution to the intermediate resolution.

The invention also relates to a digital apparatus including the device according to the invention or means for implementing the method according to the invention. This digital apparatus is for example a computer, a digital camera, a digital camcorder, a scanner, a printer, a photocopier, or a fax machine. The advantages of the device and of the digital apparatus are identical to those already set out.

An information storage means, which can be read by a computer or microprocessor, integrated or not into the device, and possibly removable, stores a program implementing the method according to the invention.

A computer program readable by a microprocessor and comprising one or more sequences of instructions is capable of implementing the method according to the invention.

The characteristics and advantages of the present invention will appear more clearly from a reading of a preferred embodiment illustrated by the accompanying drawings, in which.

Figure 1:
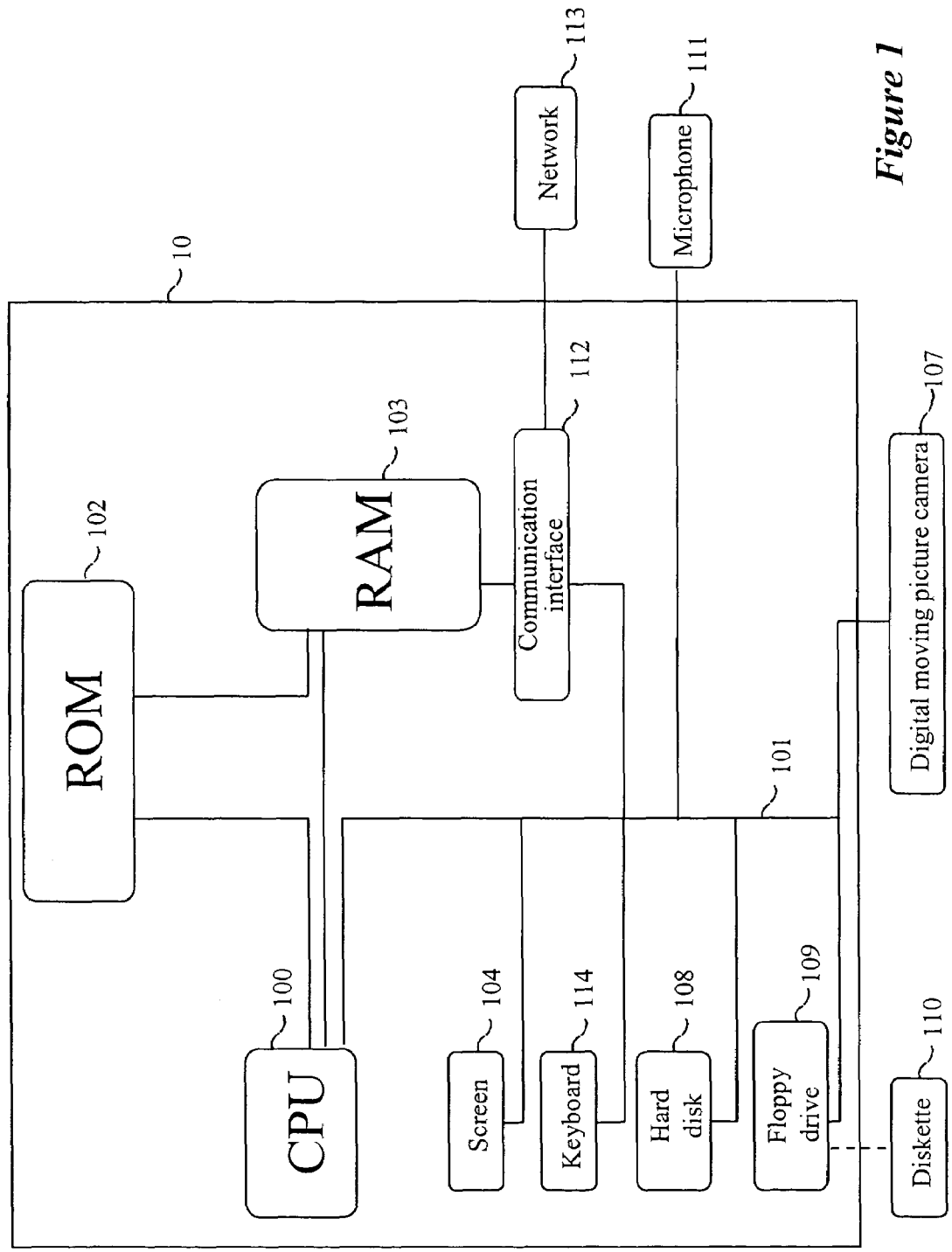
FIG. 1 is an embodiment of a device implementing the invention.

According to the chosen embodiment represented in FIG. 1, a device implementing the invention is for example a microcomputer 10 connected to different peripherals, for example a digital moving picture camera 107 (or a scanner, or any means of acquiring or storing an image) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may for example be a diskette, a CD-ROM, or a DVD-ROM. The disk 110 like the hard disk 108 can contain data processed according to the invention as well as the program or programs implementing the invention which, once read by the device 10, will be stored on the hard disk 108. According to a variant, the program enabling the device to implement the invention can be stored in read only memory 102 (referred to as ROM in the drawing). In a second variant, the program can be received in order to be stored in an identical fashion to that described previously via the communication network 113.

The device 10 is connected to a microphone 111. The data to be processed according to the invention will in this case be audio signal.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the method according to the invention.

The communication bus 101 affords communication between the different elements included in the microcomputer 10 or connected to it. The representation of the bus 101 is not limiting and, in particular, the central processing unit 100 is able to communicate instructions to any component of the microcomputer 10 directly or by means of another element of the microcomputer 10.

Figure 2:
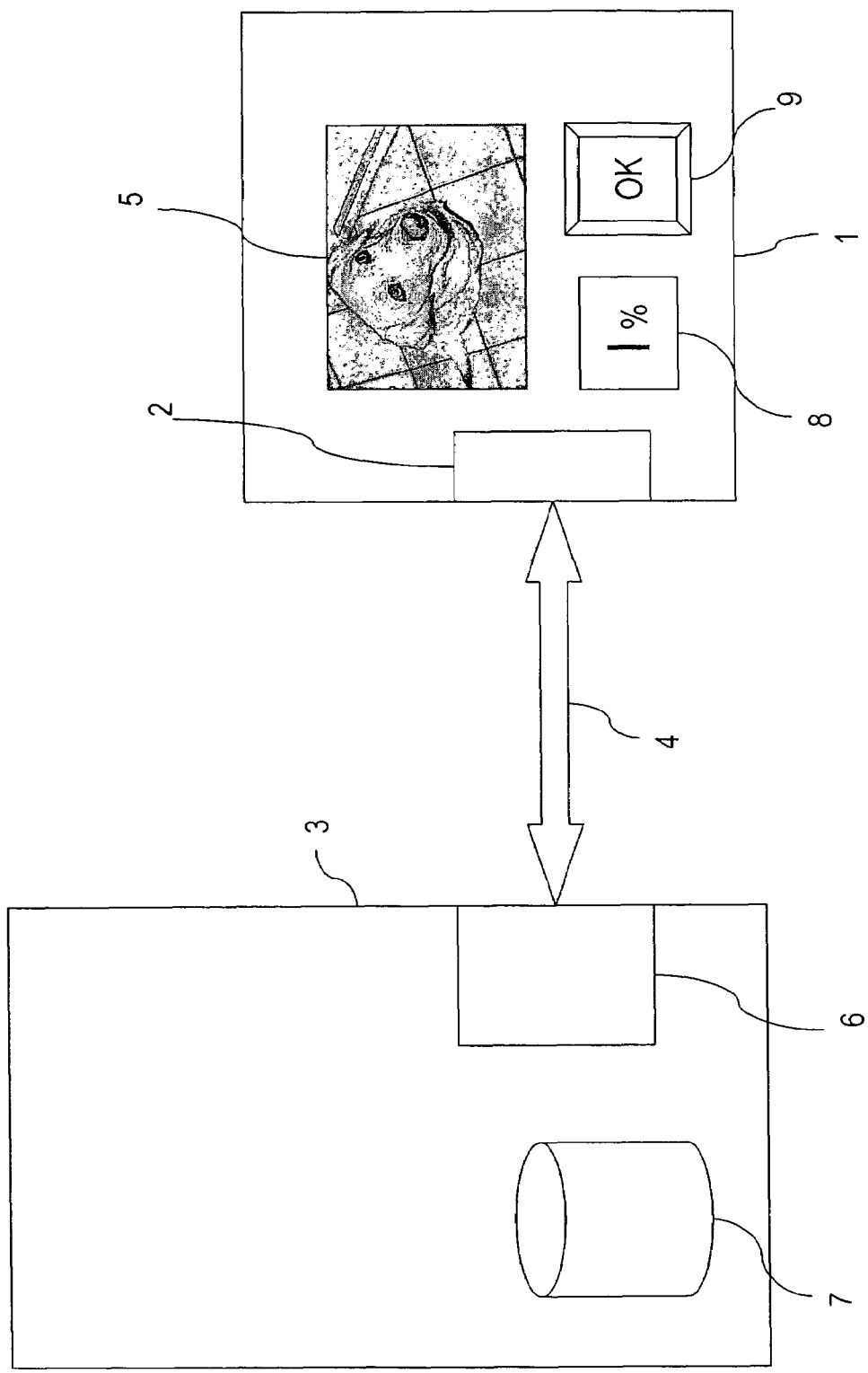
FIG. 2 represents an encoding device according to the invention and a corresponding decoding device.

With reference to FIG. 2, an embodiment of a decoding device according to the invention is adapted to decode a digital signal with the object of decompressing it. The decoding device is integrated into an apparatus, which is for example a client terminal 1 or a computer.

The client terminal 1 comprises a communication software application 2 adapted to communicate with a server 3 via a telecommunication network 4.

The client terminal comprises means for viewing the image, such as a screen 5.

The server 3 comprises a communication software application 6 adapted to communicate with remote terminals via the telecommunication network 4.

The communications between the server 3 and the client terminal 1 are conventional and are not detailed here.

The server 3 has a compressed file 7 in memory containing the encoded data of an image. The encoded data of the image comprise a plurality of predetermined resolutions and, within each predetermined resolution, a plurality of layers.

The image was, for example, encoded according to the JPEG2000 standard. The compressed file enables the resolutions 1000×1000, 500×500 and 250×250 pixels to be accessed.

Figure 3:
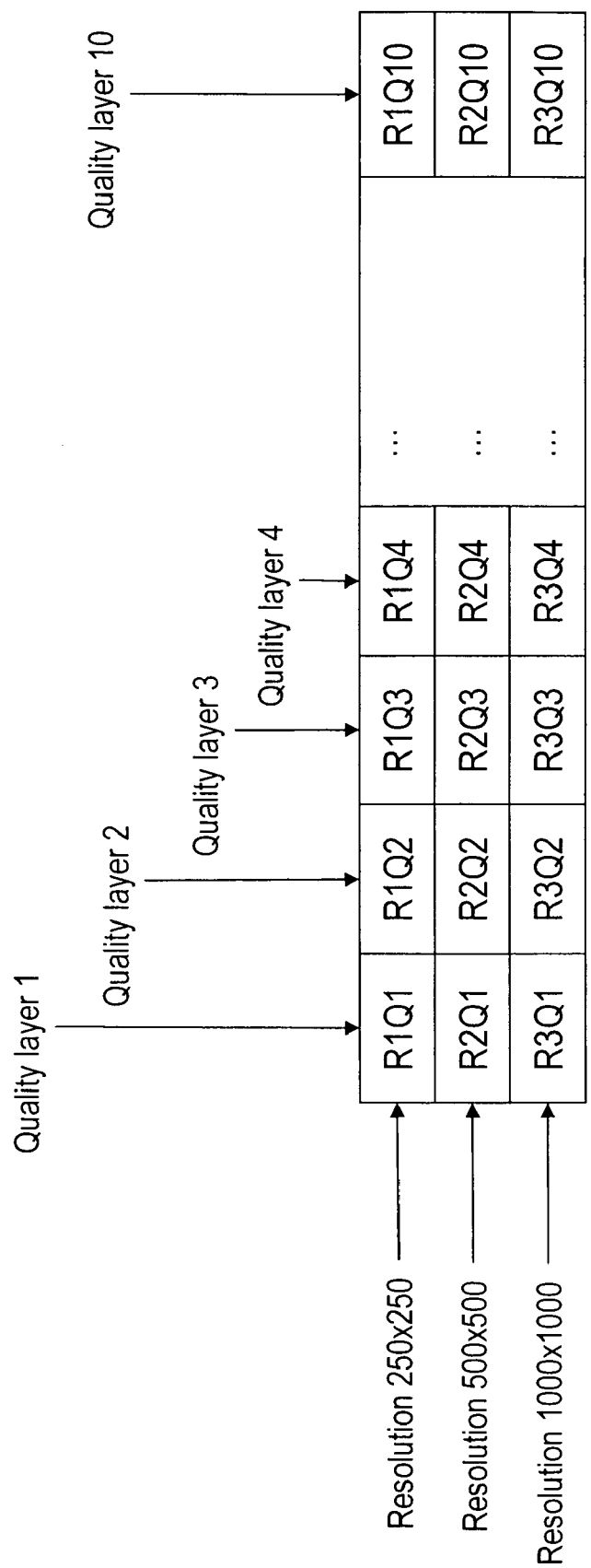
FIG. 3 represents the structure of a compressed file containing the data to decode.

FIG. 3 represents the structure of the compressed file 7. The data are classified by resolution, here three resolutions R1 to R3. Within a given resolution, the data are organized by quality layer, here ten layers Q1 to Q10. The first quality layers are those which give the greatest gain in quality for a given resolution.

In the context of the invention, the client terminal 1 comprises means for the user to select a display resolution of the image. For example, a text input field 8 enables the user to enter a desired enlargement percentage, or zoom, for the image in course of being processed.

The client terminal also comprises a zoom validation button 9 for validating the enlargement value entered in the text field 8.

Thus the user indicates an enlargement percentage for the image and validates his choice. For example, he can request a zoom of 150%, which corresponds to an increase of 50% of the height of the image and an increase of 50% of the width of the image. If he requests a zoom of 110%, this corresponds to an increase of 10% of the height of the image and an increase of 10% of the width of the image.

Of course, other means for selecting the display resolution of the image may be envisaged, for example by moving a cursor on the image display screen using a computer mouse.

The decoding device 1 according to the invention comprises:

means for selecting a resolution lower than the highest of the predefined resolutions,
means for determining the predefined resolution immediately above the selected resolution,
means for determining a quantity of data of the determined predefined resolution, as a function of the ratio between the selected resolution and the determined predefined resolution,
means for decoding the image at the determined predefined resolution, as a function of the determined quantity of data,
means for subsampling the decoded image, as a function of the ratio between the selected resolution and the determined predefined resolution.

These means are implemented in the computer 10 of FIG. 1. The operation of device 1 is detailed below using an algorithm.

Of course, the means for implementing the invention and the means for storing the image to be decoded may be integrated into the same apparatus.

Figure 4:
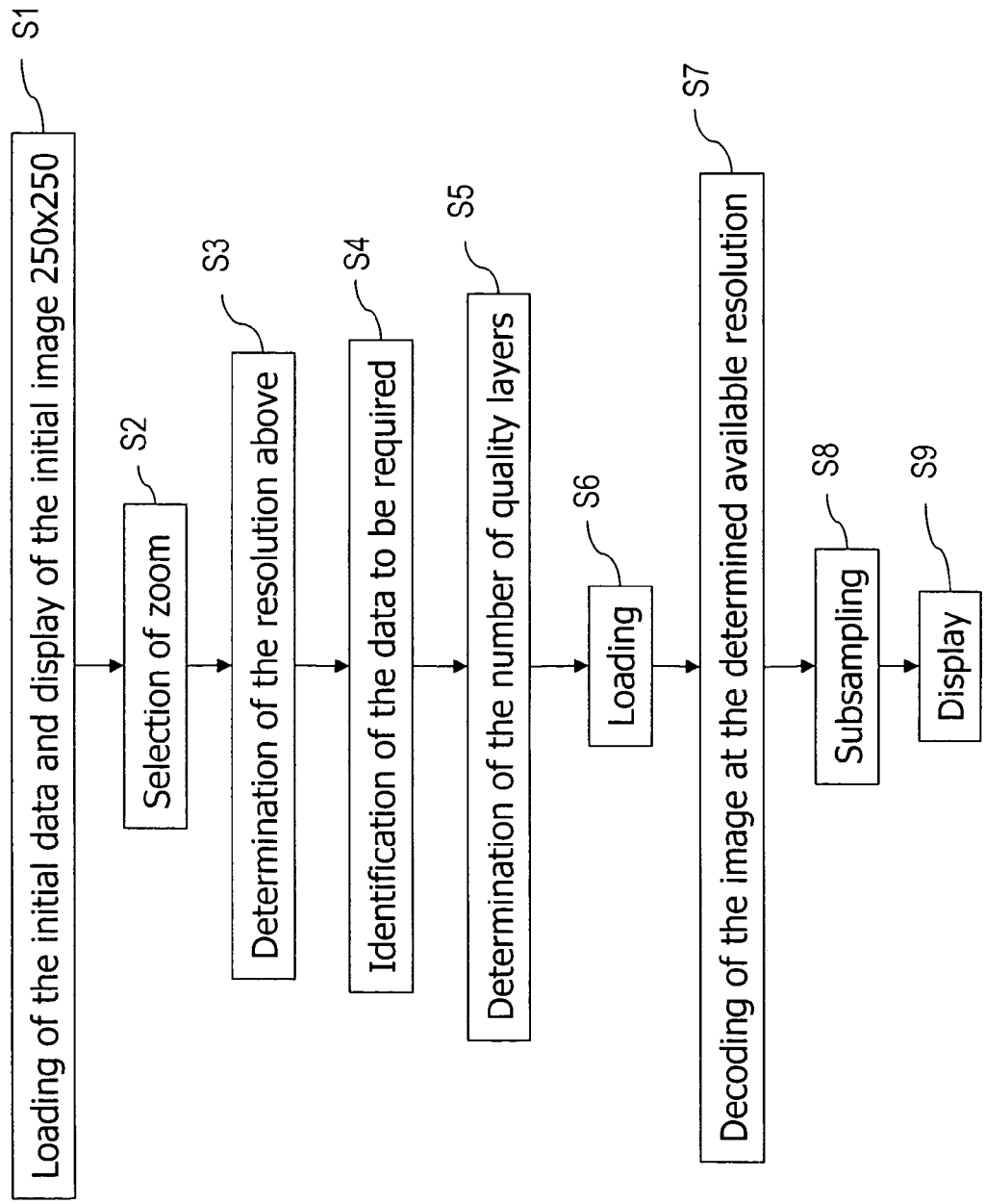
FIG. 4 represents an embodiment of a decoding method according to the invention.

FIG. 4 shows an embodiment of a method of decoding an image, according to the invention. This method is implemented in the decoding device and comprises steps S1 to S9.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S1 is the loading of the encoded data of the image at the resolution of 250×250 pixels, in response to a request sent from the client terminal to the server. The request, its transmission, and the transmission of the encoded data are conventional and are not detailed here.

The encoded data transmitted here are all the quality layers of the first resolution, i.e. RQ1 to RQ10.

These encoded data are decoded in conventional manner: entropy decoding, then dequantization of the coefficients obtained and finally inverse wavelet transformation.

The image is displayed on the client terminal. The object of the decoding of the data and display of the image at the resolution of 250×250 pixels is to enable the user to view the image and to choose the resolution at which he desires to obtain the image.

Of course, the invention may be implemented without this prior viewing.

The following step S2 is the selection by the user of a resolution. This resolution may be one of the predetermined resolutions or an arbitrary resolution, lower than the highest predetermined resolution.

The first case is conventional decoding, and we are thus concerned with the second case in what follows. Nevertheless, it should be noted that the invention also makes it possible to decode an image at one of its predetermined resolutions.

The selection of resolution is made via the text field 8 and the validation button 9 (FIG. 2).

It is assumed in what follows that the user has requested a zoom of 150%, thus he has chosen to increase the height and width of the image each by 50%. He thus desires to obtain an image of 375×375 pixels.

The following step S3 is the determination of the predetermined resolution immediately above the resolution requested by the user. In this case it is the resolution R2 of 500×500 pixels.

The following step S4 is the identification of the data to be required in order to meet the user's request. In this case it is supplementary data, since the data corresponding to the resolution of 250×250 pixels is already possessed.

Naturally, if the data corresponding to the resolution of 250×250 pixels was not possessed, it would form part of the data to be required.

The data to be required is determined in the following manner.

The resolution selected by the user necessitates 375×375 pixels, i.e. 140625 pixels. The image at the resolution of 250×250 pixels comprises 62500 pixels. Therefore 140625−62500, i.e. 78125 supplementary pixels are required.

However the predetermined resolution immediately above the resolution selected by the user comprises 500×500 pixels, i.e. 250000 pixels, that is to say 187500 pixels more than the resolution of 250×250 pixels.

The number of supplementary pixels required (78125) thus represents 41.6% of the number of supplementary pixels of the resolution of 500×500 pixels.

The request will thus concern 41.6% of the data of the predetermined resolution immediately above the resolution selected by the user.

The following step S5 is the determination of the quantity of data of the resolution R2 determined at step S3.

It is possible to select at random 41.6% of the data of resolution R2. It is also possible to select 41.6% of the data of resolution R2 in the order in which they are found in the compressed file.

In the preferred embodiment of the invention, the encoded data are organized in resolution levels, and in quality layers within each resolution level. This is the case in particular for the JPEG2000 standard.

In this case, it is simpler to decode a whole number of quality layers. Consequently, the data to be required is a whole number of quality layers of the resolution 500×500 pixels which most closely corresponds to 41.6% of supplementary data. As it is assumed that there are ten layers per resolution level, the request is thus for 4 quality layers of the resolution 500×500 pixels.

Furthermore, the layers are arranged in decreasing order of importance. The first layer provides more information than the second and so forth. Thus the four most important layers are selected.

These four layers are the layers R2Q1, R2Q2, R2Q3 and R2Q4.

The following step S6 is the loading of the encoded data of the layers R2Q1, R2Q2, R2Q3 and R2Q4 determined earlier, in response to a request sent from the client terminal to the server. The request, its transmission and the transmission of the encoded data are conventional and are not detailed here.

The following step S7 is the decoding of the aforementioned data. This decoding is carried out in conventional manner: entropy decoding, then dequantization of the coefficients obtained and finally inverse wavelet transformation.

At this step, the data corresponding to the layers R1Q1 to R1Q10 and R2Q1 to R2Q4 is thus available. This data is at resolution R2.

The following step S8 is a subsampling of the image determined at the previous step so as to obtain the resolution desired by the user.

This subsampling is conventional, and is for example similar to that set out in the document "Fast and high performance image subsampling using feedforward neural networks" by A. Dumitras and F. Kossentini, which appeared in IEEE Transactions on Signal processing, Vol. 9, No. 4, April 2000, p. 720-728.

The subsampling consists overall of taking a sample. every N samples, where N is an integer which depends on the level of subsampling.

Thus, to subsample a line of pixels $\{x_i\}$ of the image of 500×500 pixels, for i varying from 0 to 499, into a line of 375 pixels $\{y_j\}$, for j varying from 0 to 374, the following formula is applied:

$y_j = X_{E(375 \cdot i/500)}$, where E( . . . ) designates the integer part.

The following step S9 is the display of the image at the resolution desired by the user.

Naturally, if the change in resolution is followed by a corresponding change in the dimensions of the window displaying the image, the subsampling operation corresponds to a scaling operation.

If at step S2 the user requests a zoom of 110%, that corresponds to an image size of 275×275 pixels, i.e. 75625 pixels. Thus 13625 supplementary pixels are required with respect to the predetermined resolution of 250×250 pixels.

The predetermined resolution immediately above the resolution selected by the user is again 500×500 pixels, which comprises 187500 supplementary pixels with respect to the predetermined resolution of 250×250 pixels.

The number of supplementary pixels required (13625) thus represents 7.3% of the number of supplementary pixels of the resolution of 500×500 pixels.

The request will thus concern 7.3% of the data of the predetermined resolution immediately above the resolution selected by the user. As in the preceding example, the request in practice relates to the whole number of layers closest to that percentage, i.e. one layer.

Of course, the present invention is in no way limited to the embodiment described and represented, but encompasses, on the contrary, any variant form within the capability of the person skilled in the art.

The invention claimed is:

1. A method of decoding an encoded digital image, decodable at a plurality of predefined resolutions, comprising the steps of:
   selecting a resolution lower than the highest of the predefined resolutions and different from each of the predefined resolutions;
   determining a predefined resolution immediately above the selected resolution;
   determining a quantity of data of the determined predefined resolution, as a function of a ratio between a number of pixels of the selected resolution and a number of pixels of the determined predefined resolution;
   decoding the image including the data of the determined predefined resolution, as a function of the determined quantity of data; and
   subsampling the decoded image, as a function of the ratio between the selected resolution and the determined predefined resolution.

2. A decoding method according to claim 1, comprising the prior display of the image at a predefined initial resolution, wherein the selection of a resolution is an instruction for a change of size of the image with respect to the predefined initial resolution.

3. A decoding method according to claim 1, the encoded data comprising a plurality of layers within each predefined resolution, wherein the determination of a quantity of data is the determination of a number of layers of the determined predefined resolution.

4. A decoding method according to claim 1, wherein the determination of a quantity of data of the determined predefined resolution is performed as a function of the ratio between the number of pixels of the selected resolution and the number of pixels of the determined predefined resolution.

5. A decoding method according to claim 1, wherein the decoding of the image including the selected data at the determined predefined resolution is furthermore carried out as a function of the data of the predefined resolutions lower than the selected resolution, if the determined predefined resolution is not the lowest for the image considered.

6. A method of decoding encoded data, decodable at a plurality of predefined resolutions $R_n$, comprising the steps of:

determining an intermediate resolution between a first predefined resolution $R_a$ and a second predefined resolution $R_{a+1}$, the intermediate resolution being different from the first predefined resolution $R_a$ and the second predefined resolution $R_{a+1}$;

selecting encoded data corresponding to the intermediate resolution;

decoding the selected encoded data; and scaling the decoded data, as a function of a ratio between a number of pixels of the intermediate resolution and a number of pixels of one of the plurality of the predefined resolutions $R_n$, wherein the selected encoded data includes encoded data corresponding to the first predefined resolution $R_a$, and a part of encoded data corresponding to the second predefined resolution $R_{a+1}$ but not included in the encoded data corresponding to the first predefined resolution $R_a$.

7. A method of decoding encoded data, decodable at a plurality of predefined resolutions, comprising the steps of:

selecting an intermediate resolution between a first predefined resolution and a second predefined resolution, the second resolution being higher than the first predefined resolution, the intermediate resolution being different from the first predefined resolution and the second predefined resolution;

determining a quantity of encoded data of the second resolution depending on the intermediate resolution;

selecting, as a function of the determined quantity of encoded data, data from encoded data of the second resolution;

decoding the selected data; and subsampling the decoded data from the second resolution to the intermediate resolution.

8. A decoding method according to claim 7, wherein the determined quantity of encoded data is a function of a ratio between the intermediate resolution and the second predefined resolution.

9. A device for decoding an encoded digital image, decodable at a plurality of predefined resolutions, comprising:

means for selecting a resolution lower than the highest of the predefined resolutions and different from each of the predefined resolutions;

means for determining a predefined resolution immediately above the selected resolution;

means for determining a quantity of data of the determined predefined resolution, as a function of a ratio between a number of pixels of the selected resolution and a number of pixels of the determined predefined resolution;

means for decoding the image including the data of the determined predefined resolution, as a function of the determined quantity of data; and means for subsampling the decoded image, as a function of the ratio between the selected resolution and the determined predefined resolution.

10. A decoding device according to claim 9, comprising means for prior display of the image at a predefined initial resolution, wherein the means for selecting a resolution makes it possible to enter an instruction for change of size of the image with respect to the predefined initial resolution.

11. A decoding device according to claim 10, the encoded data comprising a plurality of layers within each predefined resolution, wherein the means for determining a quantity of data are adapted to determine a number of layers of the determined predefined resolution.

12. A decoding device according to claim 9, wherein the means for determining a quantity of data of the determined predefined resolution are adapted to perform the determination as a function of the ratio between the number of pixels of the selected resolution and the number of pixels of the determined predefined resolution.

13. A decoding device according to claim 9, wherein the means for decoding the image including the selected data at the determined predefined resolution are adapted to perform the decoding furthermore as a function of the data of the predefined resolutions lower than the selected resolution, if the determined predefined resolution is not the lowest for the image considered.

14. A device for decoding encoded data, decodable at a plurality of predefined resolutions $R_n$, comprising:

means for determining an intermediate resolution between a first predefined resolution $R_a$ and a second predefined resolution $R_{a+1}$, the intermediate resolution being different from the first predefined resolution $R_a$ and the second predefined resolution $R_{a+1}$;

means for selecting encoded data corresponding to the intermediate resolution;

means for decoding the selected encoded data; and means for scaling the decoded data, as a function of a ratio between a number of pixels of the intermediate resolution and a number of pixels of one of the plurality of the predefined resolutions $R_n$, wherein the selected encoded data includes encoded data corresponding to the first predefined resolution $R_a$, and a part of encoded data corresponding to the second predefined resolution $R_{a+1}$ but not included in the encoded data corresponding to the first predefined resolution $R_a$.

15. a device for decoding encoded data, decodable at a plurality of predefined resolutions, comprising:

means for selecting an intermediate resolution between a first predefined resolution and a second predefined resolution, the second predefined resolution being higher than the first predefined resolution, the intermediate resolution being different from the first predefined resolution and the second predefined resolution;

means for determining a quantity of encoded data of the second resolution depending on the intermediate resolution;

means for determining a quantity of data of the determined predefined resolution, as a function of a ratio between a number of pixels of the selected resolution and a number of pixels of the determined predefined resolution;

means for decoding the data as a function of the determined quantity of data; and means for subsampling the decoded data from the second predefined resolution to the intermediate resolution.

16. A decoding device according to claim 15, wherein the determined quality of encoded data is a function of a ratio between the intermediate resolution and the second resolution.

17. A decoding device according to any one of claims 9, 14 or 15, wherein said means for determining, decoding and sub sampling are incorporated in: a microprocessor, a read only memory, storing a program for processing the data, and a random access memory comprising registers adapted to record variables modified during the execution of said program.

18. An apparatus for processing a digital image, comprising means adapted to implement the method according to claim 1.

19. An apparatus for processing a digital image, comprising the device according to any one of claims 9, 14 and 15.

* * * * *